Feb. 12, 1952 — C. J. POTTER — 2,585,169
MOTOR-OPERATED MATERIAL HANDLING EQUIPMENT
Filed Aug. 9, 1947 — 6 Sheets-Sheet 1

INVENTOR.
Clarence J. Potter

Feb. 12, 1952  C. J. POTTER  2,585,169
MOTOR-OPERATED MATERIAL HANDLING EQUIPMENT
Filed Aug. 9, 1947  6 Sheets-Sheet 2
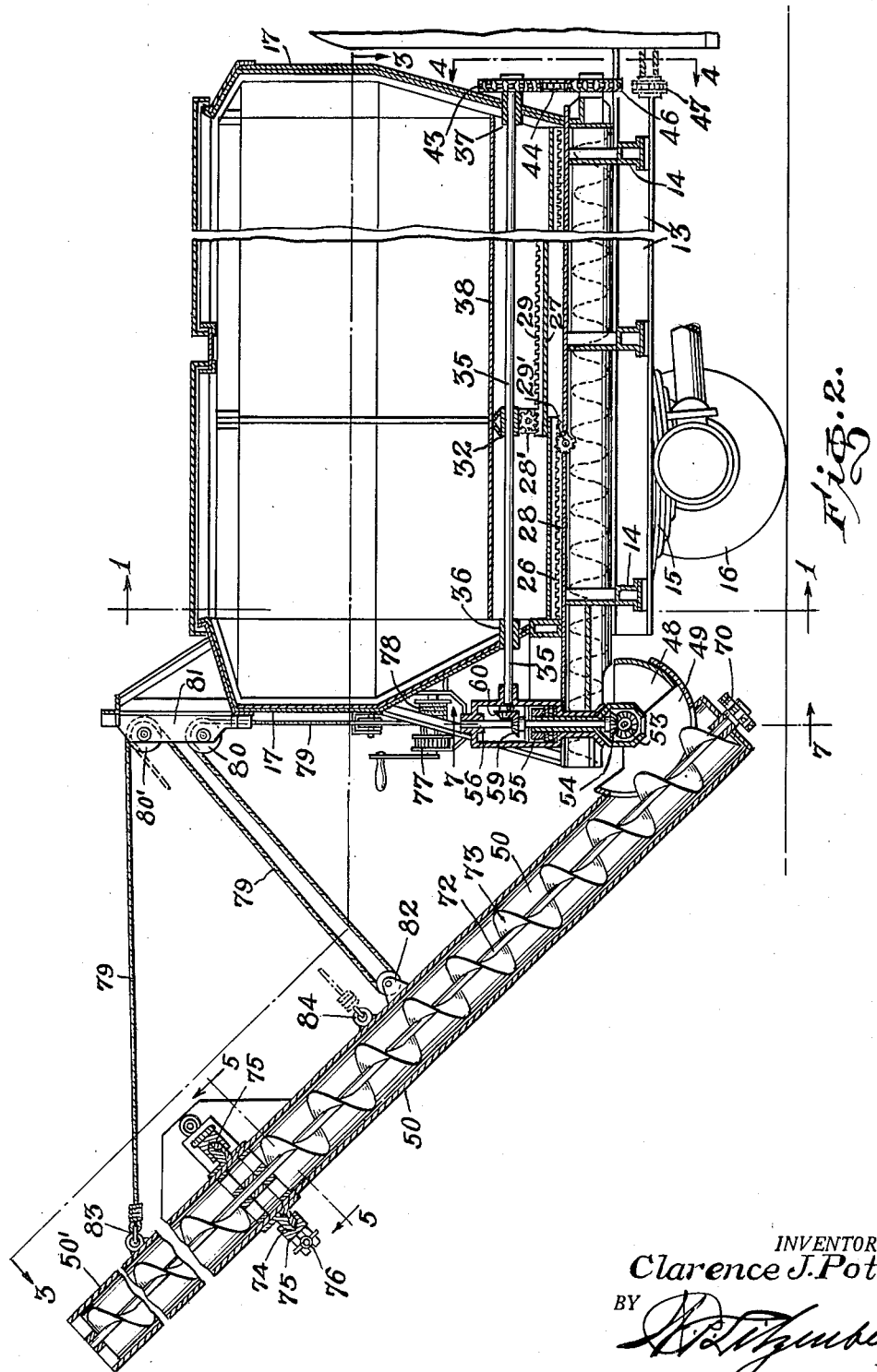
INVENTOR.
*Clarence J. Potter*
BY
ATTORNEY.

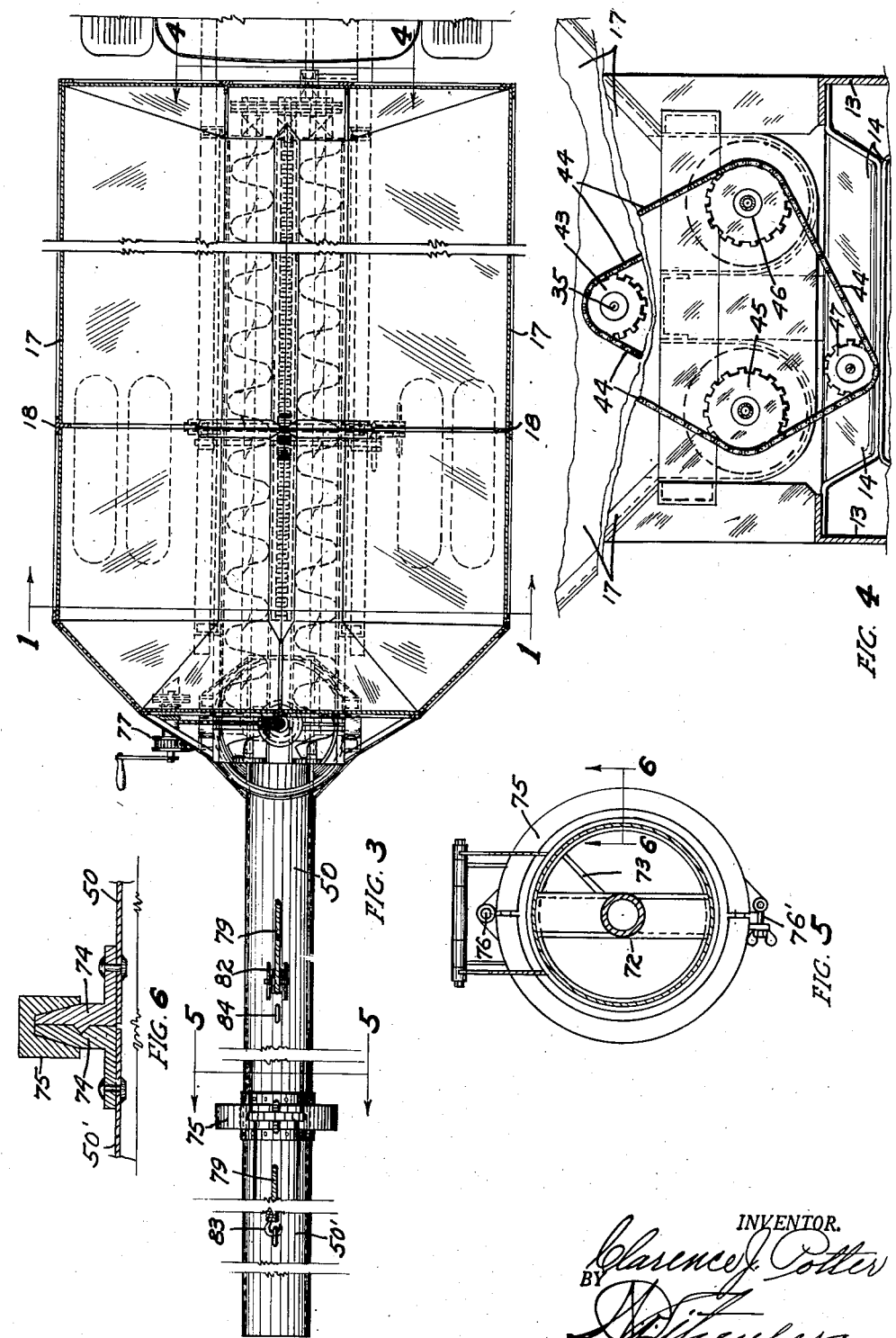

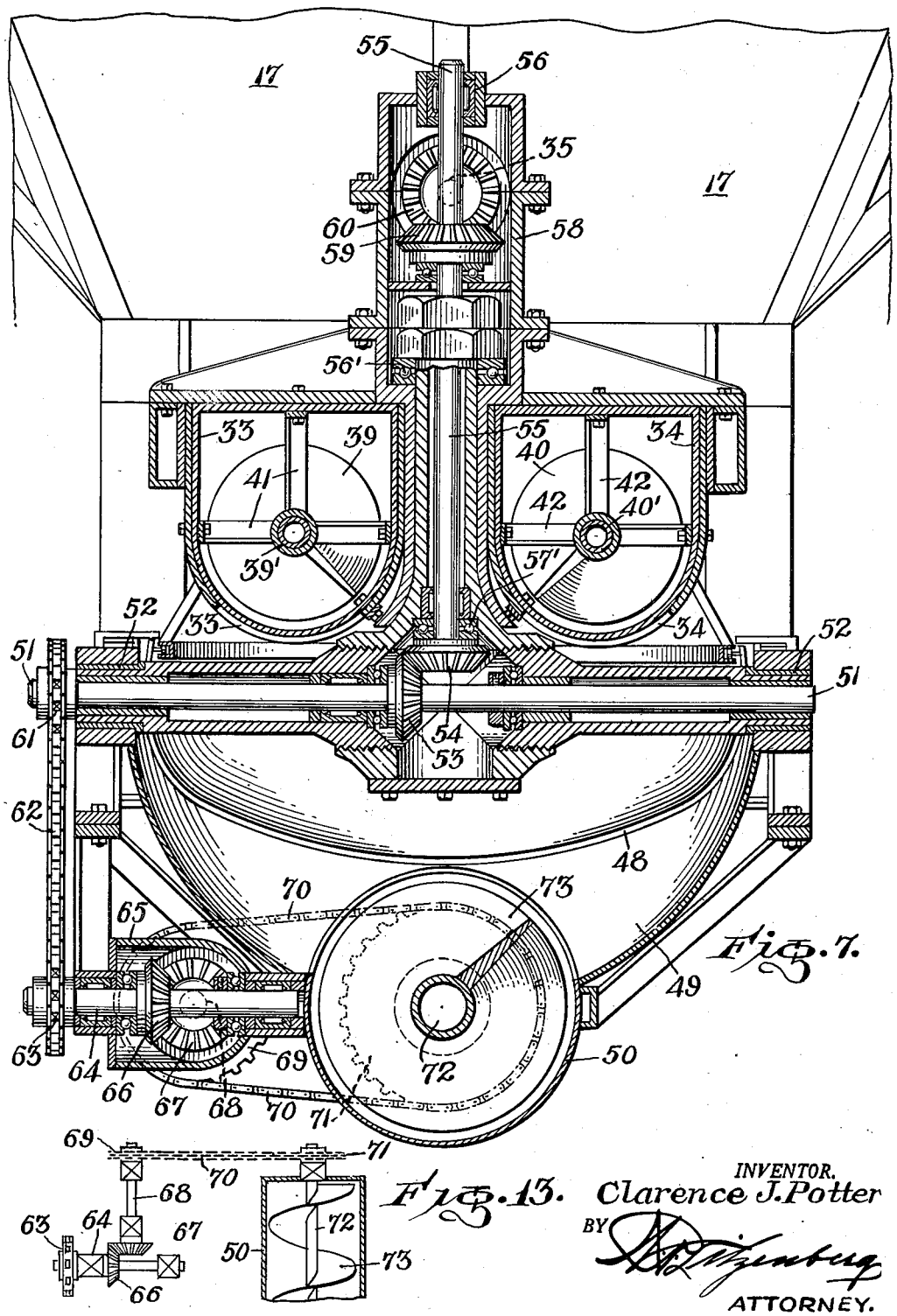

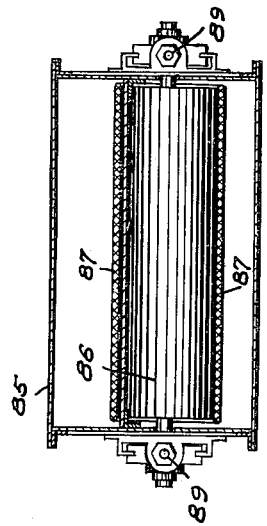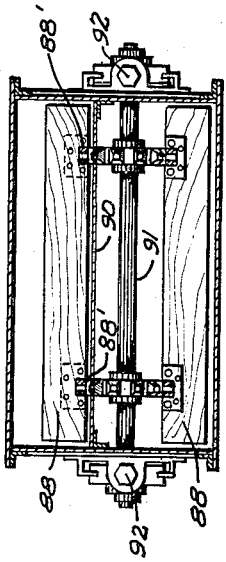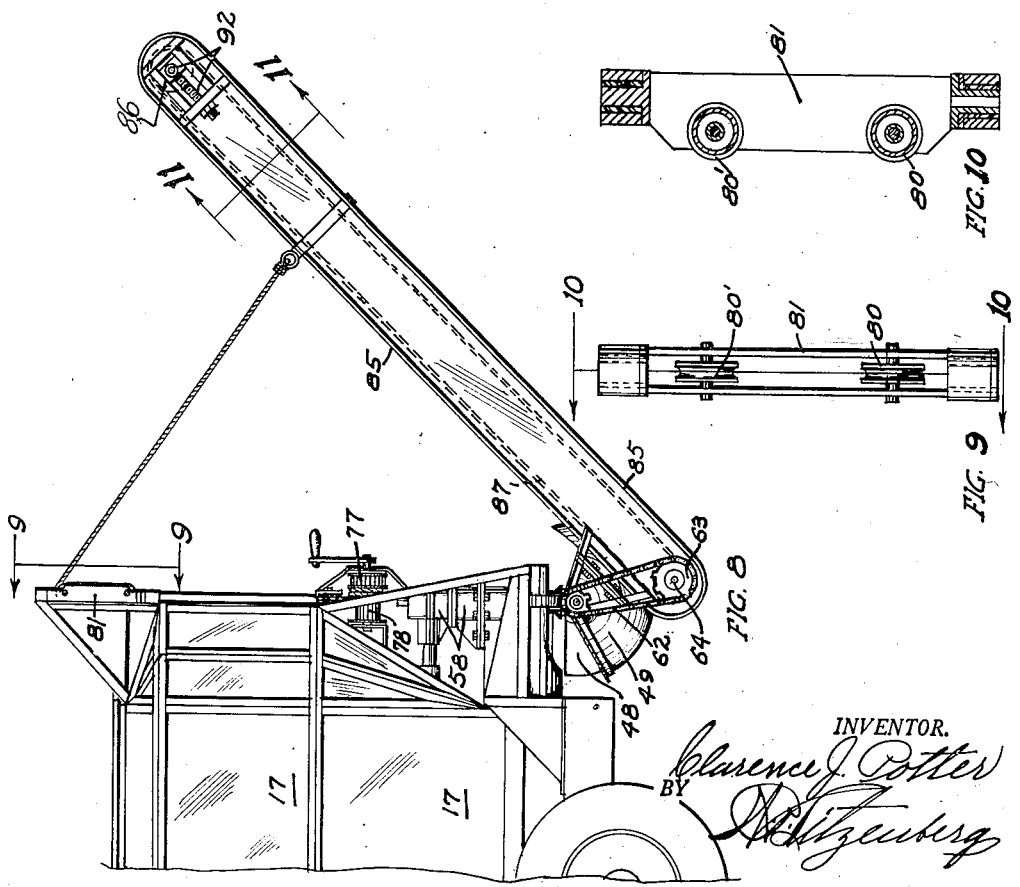

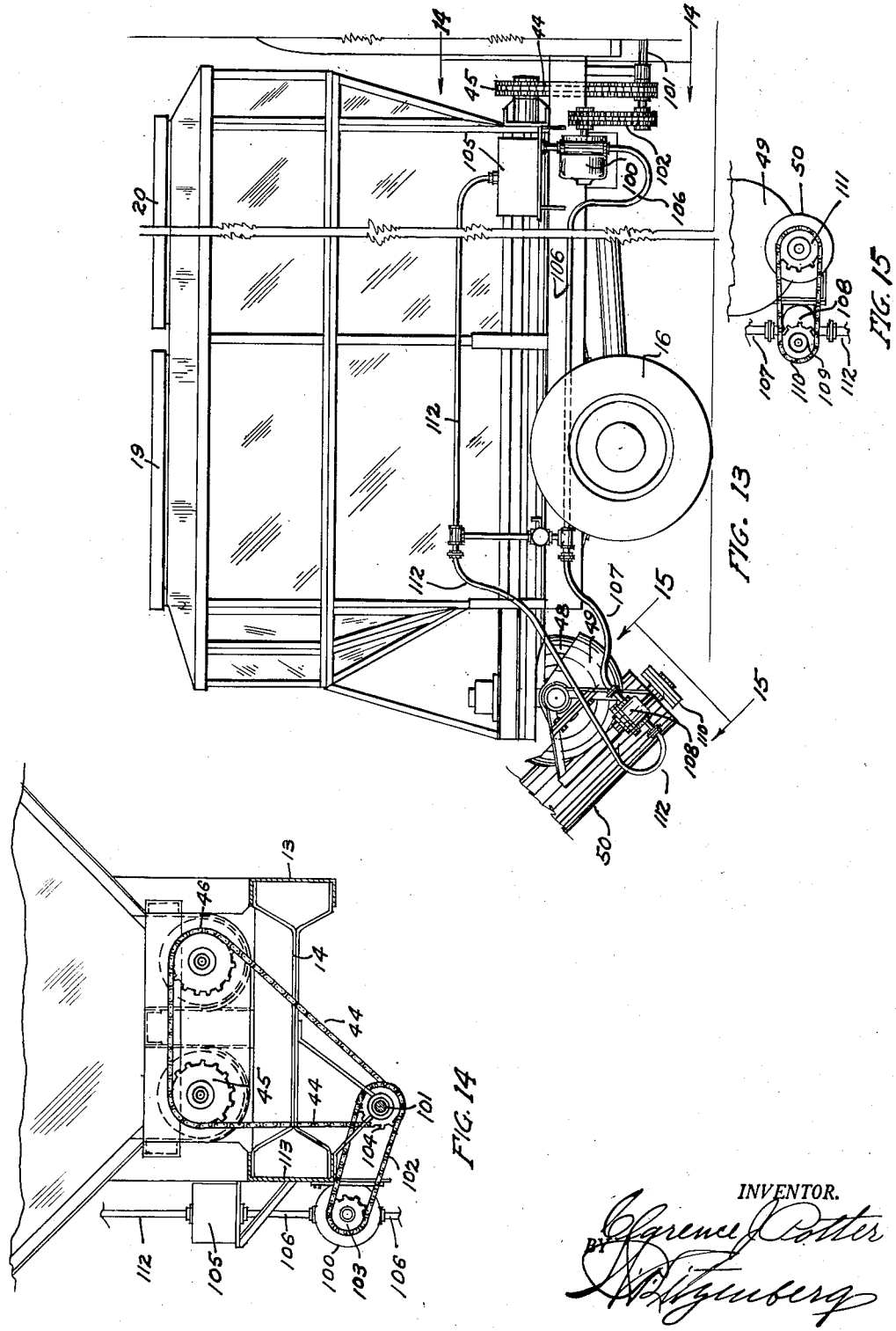

Patented Feb. 12, 1952

2,585,169

UNITED STATES PATENT OFFICE 2,585,169

MOTOR-OPERATED MATERIAL HANDLING EQUIPMENT

Clarence J. Potter, Fullerton, Calif., assignor to Triangle Grain Company, Bellflower, Calif.

Application August 9, 1947, Serial No. 767,728

5 Claims. (Cl. 214—83.16)

1

This invention relates to motor operated material handling equipment, and has as its principal object to provide a practical and efficient motor-operated vehicle for handling loose materials in bulk, and transporting them from place to place, and unloading them in receiving bins, buildings and other places, whether on the level, or at various elevations, thus greatly simplifying the task of delivering such materials.

Among the salient objects of the invention are:

To provide a self-contained, motor-operated, vehicle in which the unloading mechanism is a part of the main equipment, and in which the various adjustments of the unloading mechanism are universal and adapted to most any condition;

To provide in such a structure, an arrangement whereby the material being handled is protected from the elements, and from dust and dirt, and from open exposure during the handling operation, and with a minimum of handling;

To provide a spherical hopper-like connection from the vehicle conveyor or discharge to the swinging and adjustable unloading conveyor arm, whereby to avoid loss or exposure of the material being unloaded;

To provide whereby hydraulic power means can be used in connection with the operation of the unloading mechanism; and, in general, to provide a practical, convenient, efficient and economical mechanism of the character referred to for handling loose materials.

In order to explain the invention more in detail, I have illustrated one embodiment thereof on the accompanying six sheets of drawings, which I will now describe.

Figure 2 is a longitudinal sectional view taken on the line 2—2 of Fig. 1;

Figure 3 is a horizontal sectional view taken on the angular line 3—3 of Fig. 2;

Figure 4 is a fragmentary sectional view taken on the line 4—4 of Figs. 2 and 3, with parts broken away to reduce the size of the view;

Figure 5 is a sectional view taken on the line 5—5 of Fig. 3;

Figure 6 is an enlarged sectional detail taken on the line 6—6 of Fig. 5;

Figure 7 is an enlarged sectional view taken on the line 7—7 of Fig. 2, with the elevating conveyor lowered into the horizontal position;

Figure 8 is a fragmentary side elevation of the end of the invention, with a modified form of unloading conveyor;

2

Figure 1:
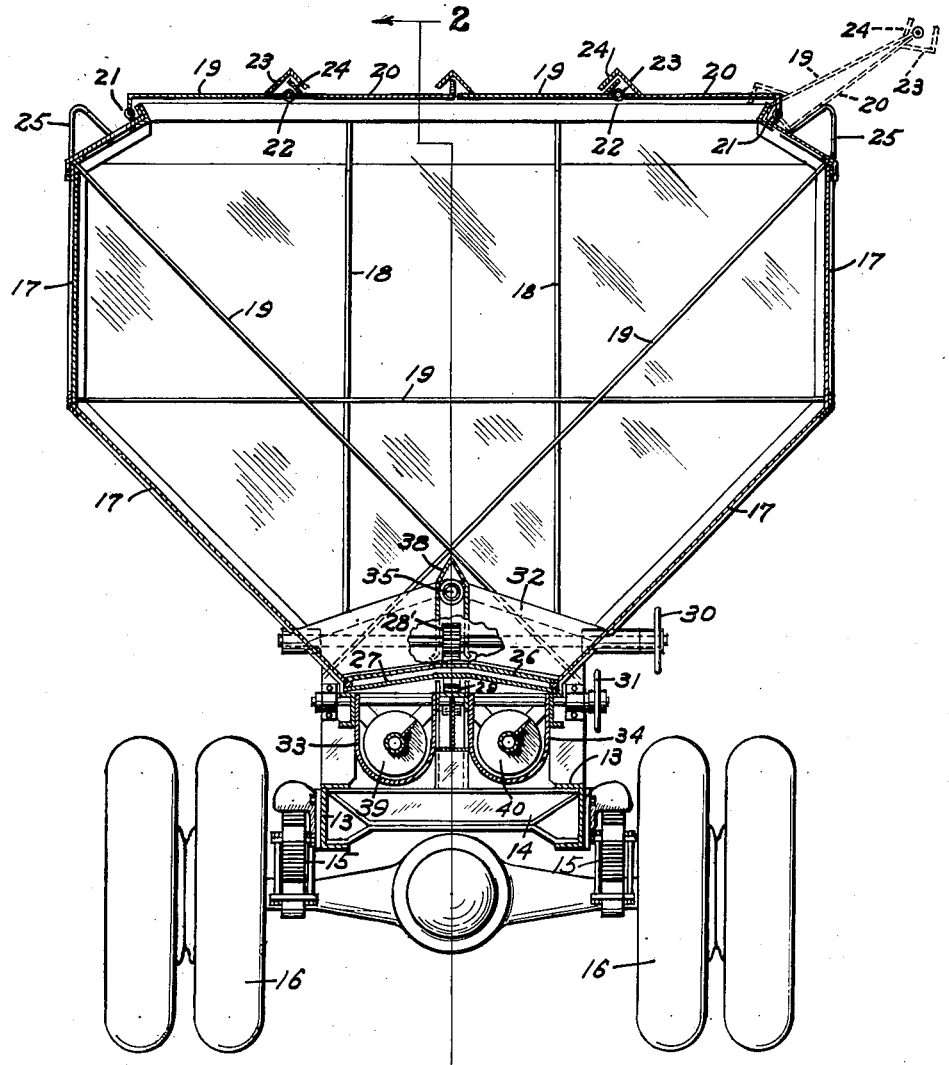
Figure 1 is a vertical sectional view of a motor operated material handling equipment, embodying my invention, taken on the line 1—1 of Fig. 2.

Figure 9 is a fragmentary sectional view looking at line 9—9, of Fig. 8;

Figure 10 is a sectional view on line 10—10, Fig. 9;

Figure 11 is a sectional view on line 11—11, Fig. 8, through the modified form of unloading conveyor;

Figure 12 is a sectional view through a conveyor but showing pusher slats on an endless sprocket chain, moving on a floor;

Figure 13 is a side elevation of the invention showing hydraulic power means for operating the discharge or feed elevator and its screw feed;

Figure 14 is a fragmentary elevation at the rear, looking on line 14—14, of Fig. 3; and Figure 15 is an end view of the parts seen from line 15—15, Fig. 13.

Referring now in detail to the drawings, my invention is intended to be mounted on, and to be a part of a motor truck or carrier, and it can be of any suitable type and size. In the present form used for explanatory purposes, a motor truck or vehicle having the channel iron side members 13, 13, with connecting cross members 14, 14, springs 15, 15, carrier wheels 16, 16, and the usual motor driving mechanisms and connections, as will be understood from the general showing in Figs. 1, 2 and 3, in particular.

Mounted on this carrier mechanism, of whatever type it may be, is a material holding body, designated 17, which may be of a single chamber, or divided into several bins or compartments for the material or materials to be transported, as may be best suited to the particular business.

The present body is formed with intermediate frame members of T-form, as at 18, 18, and with cross tie rods, as 19, 19, to give strength and rigidity to the body.

The top of the body is provided with two cover members, each composed of two hinged sections, as 19 and 20, hinged to the body, as at 21, and hinged together, as at 22, with weather guards, as 23 and 24 over said joints. This protects from rain and dust, and makes it possible to fold said cover sections back in open position, as seen in Fig. 1, where one pair of cover sections are indicated in open position in light broken lines. Supporting rests, as 25, 25, are provided for said cover sections.

In the bottom of said body, are slide doors, as 26 and 27, operated by racks, as 28 and 29, and gears 28' and 29', with operating hand wheels, as 30 and 31, Fig. 1. Said slide doors are shown to be one above the other and adjacent each other, as will be seen in Figs. 1 and 2, said slide doors being slightly bowed or arched, as will be seen in Figure 1. One of said doors is opened to permit material to pass therethrough, and afterward the other is opened, as will be understood from Fig. 2. The operating gear 28' has a housing 32 over it. Longitudinally extending, spaced, U-shaped trough members, as 33 and 34, are shown in section in Fig. 1, open at their upper sides to receive material from said body or bin, as will be understood. The cover or housing for said gears is broken away in a spot in Fig. 1 to show the gears and their shafts therein.

A shaft 35 extends lengthwise of said body, above said gear 28', and this shaft has bearings at its opposite ends, as at 36 and 37, and has a guard or housing, as 38 over it, as seen in Figs. 1 and 2. The top of said guard or housing, as seen in Fig. 2, is of inverted V-form and extends down along the opposite sides of the shaft 35.

By the operation of the hand wheels 30 or 31, the slide doors can be selectively opened and closed to allow material to pass down into the U-shaped troughs 33 and 34, for conveyance to the discharge ends thereof, now to be described.

In said troughs 33 and 34 are two screw members, 39 and 40, having suitable bearings at their opposite ends, as illustrated in Fig. 7, which is an enlarged sectional view taken on the line 7—7 of Fig. 2. Said bearings are designated as a whole, 39' and 40', with suitable supporting arms or brackets 41 and 42.

The shaft 35, running lengthwise of the housing 38 in the bottom of the body, is the drive shaft for also operating the screw propeller 72, and for this purpose it is provided with a sprocket 43, over which runs an endless sprocket chain 44, as seen in Fig. 4, part of which is broken out to reduce the size of the view. Said sprocket chain runs over two sprockets, as 45 and 46, on said screw feed members 39 and 40. Said endless sprocket chain is power driven by the sprocket 47, which is on the shaft of the truck power take-off.

At the other or discharge end of said U-shaped troughs 33 and 34, and said screw feed members 39 and 40, is a hemispherical receiving member, designated 48, pivotally supported and open to receive material from said troughs, and with which telescopes another hemi-spherical member 49, mounted on and moving with a tubular delivery member or tube, made with two sections, as 50 and 50', as seen in Fig. 2, and also in Fig. 3. Said spherical members are pivotally supported on a shaft 51, having bearings 52 at its opposite ends, with a beveled gear 53 thereon, in mesh with another beveled gear 54, at the lower end of a vertical shaft 55, having its vertical bearings at 56 and 57, with ball bearings, as 56' and 57', and the upper end of which vertical shaft 55 is housed in a case 58 with beveled gear 59 thereon, in mesh with a beveled gear 60, on the end of the long shaft 35, before referred to and running through the bottom of said body, as seen in Fig. 2.

On the end of said shaft 51, Fig. 7, is a sprocket gear 61, on which runs a sprocket chain 62, to a sprocket gear 63, on a short shaft 64, in a housing 65 at one side of said spherical members 48 and 49. Said shaft 64 is provided with a beveled gear 66, in mesh with a beveled gear 67, on a short shaft 68 having a sprocket 69, over which runs a sprocket chain 70 to a sprocket gear 71 on the shaft 72 of a screw propeller 73, in said pivoted material discharge member or arm 50.

This construction and arrangement makes it possible for the discharge conveyor 50 to be raised up and down, and to be swung horizontally from one side to the other for discharging material in various places, and at various levels with the greatest of convenience and with a minimum of work.

Said discharge tube or member 50 is jointed so that it can be disjointed to shorten it when it is being transported from place to place, or when the full length is not needed. The meeting ends of the tubular members 50 and 50' are provided with meeting flanges, as 74, 74, as seen in fragmentary sectional view in Fig. 6, with a hinged channel member 75 placed around the same as shown and secured together, as with a hinge 76 and butterfly nut connection at 76.

As a means for raising and lowering said discharge tube, I have shown a windlass 77, with drum 78 and cable 79 thereon, said cable being extended up over a pulley 80, in a swinging support 81, thence down under a pulley 82 on the discharge tube 50, thence back up to a second pulley 80' in said swinging support 81, and thence to a place of attachment 83 on the outer end of said discharge tube 50', as indicated in Fig. 2.

When said discharge arm or tube is to be shortened, and the outer end 50' thereof removed, said cable 79 is detached at 83, and attached to said tube, as at 84, indicated in light broken lines, Fig. 2. The swinging pulley member 81 is shown in enlarged detail in Figs. 9 and 10, and is also seen in place in Fig. 8, as is the windlass 77 and drum 78, in which a modified form of discharge conveyor is shown, to be described later.

Referring to Figs. 8, 11 and 12, I have shown modifications in the discharge conveyor and in which a box-like body in cross section is shown, designated 85, with rollers, as 86, at its opposite ends, and an endless belt 87 is operated thereon, as indicated in Fig. 11. In Fig. 12, I have shown a variation in which pusher slats 88, on an endless chain 88', and moving on a floor, as 90, moves the material. In the outer end of said conveyor is a shaft 91 with means, as at 92, for moving the roller for the purpose of tightening said chain, in a well known manner.

In Figs. 13, 14 and 15, I have shown mechanism for making use of hydraulic power means for operating the discharge or delivery conveyor in place of the sprockets, chains, and gears. In this mechanism, I have shown an oil pump 100, driven from the power shaft 101, by a sprocket chain 102, in the manner indicated at the right of Fig. 13, and also indicated in Fig. 14, where the sprockets are designated 103 and 104 for said chain 102. This pump pulls oil from a reservoir 105, and forces it through the pipe 106, the flexible tube 107, to a hydraulic motor 108, which drives a sprocket 109, on which is a sprocket chain 110, to a sprocket 111, on the shaft of the discharge tube or member and its screw propeller, before described, and referred to as 50, 72 and 73. The hydraulic oil or fluid from the hydraulic motor 108 is returned through pipe 112 to the reservoir 105, thus completing the circuit. A valve 113 is shown for use as a diversion valve. Thus I have shown how hydraulic means can be used in driving the material moving means in the discharge or delivery conveyor 50, which hydraulic power means is operated from the motor of the vehicle.

Broadly considered, I have provided in connection with the body and the feed conveyor means in the bottom thereof, a discharge or delivery conveyor having one end pivotally supported under the end of said feed conveyor, with a two part member interposed therebetween for directing material from the feed conveyor to the delivery conveyor so as to prevent escape of material, with means for operating and adjusting said delivery conveyor, and with means for driving its material moving means from the motor of the vehicle, but I do not limit the invention to the details of construction and arrangement shown for explanatory purposes, except as I may be limited by the hereto appended claims.

I claim:

1. In a motor operated material handling machine, the combination with a motor vehicle having a body arranged with different compartments to receive and handle different materials in bulk, with cover means for said body, of a material conveyor in the bottom of said body in the form of two U-shaped trough members common to all compartments therein, with conveyors therein, and slide doors thereover to be opened to permit material from the different compartments in said body to fall thereinto, power means for driving said conveyors, a delivery carrier pivotally connected at one end under the discharge ends of said material conveyor, a receiving intermediate member between the feed end of said conveyors in the bottom of said body and said delivery carrier, said receiving intermediate member being composed of two interfitting parts open at their tops to receive material, and having an opening in their bottoms to discharge said material to said delivery carrier, means in said delivery carrier for moving material therealong to the discharge end thereof, means for raising and lowering said delivery carrier, said delivery carrier being also movable laterally to different places for discharge of said material, and means for connecting the power of said motor vehicle for operating said delivery carrier.

2. In a motor operated material handling machine, the combination therewith of a material handling body having in its bottom a pair of parallel U-shaped trough-like members with conveyors therein for moving material therealong, power means for driving said conveyors, slide doors over said U-shaped trough-like members with rack and gear means for operating them, to permit materials to be dropped into said trough-like members, a pivotally supported delivery conveyor having one end under the discharge ends of said trough-like members to receive material therefrom, and interfitting means between the ends of said members and said delivery conveyor for directing said material from one to the other without loss of any material.

3. In a motor operated material handling vehicle having a body to receive materials for transportation and delivery in bulk, two U-shaped trough-like members in the bottom of said body to receive materials therefrom, slide doors over said trough-like members with means for manually operating them selectively to deposit material from said body into said trough-like members, conveyors in said trough-like members, with connections with power means for driving them to move materials therealong to the discharge ends thereof, a delivery conveyor pivotally supported at one end under the ends of said trough-like members, to receive materials therefrom, said delivery conveyor being movably supported to be moved up and down and sidewise for delivery purposes, and a connecting receiving member between the ends of said trough-like members and the receiving end of said delivery conveyor, said member being two parts with one part connected with the ends of said trough-like members, and the other part connected with and moving with the connected end of said delivery conveyor, the two parts being nested together one within the other to receive material from one and deposit it with the other for delivery through said delivery conveyor.

4. A motor operated material handling vehicle having a body to receive materials for transportation, said body being large at its top and tapering on its opposite sides to a narrow structure with a trough-like bottom, hinged covers for the top of said body and cover means over said trough-like bottom, a propeller in said trough-like bottom for moving material therealong to its discharge end, a delivery conveyor having one end pivotally supported under the discharge end of said trough-like member to receive material therefrom, a spherical member on said trough-like member, open at its top to receive material therefrom, and open in its bottom, a spherical member on said delivery conveyor in interfitting relationship with said first spherical member to turn therein about a horizontal axis and also to swing about a vertical axis, the overlapping sides of said spherical members confining the material therein, while permitting it to pass therethrough from one to the other and to said delivery conveyor, a propeller in said delivery conveyor for moving material therealong to the discharge end thereof, means for power operating said propellers in said conveyors, and means for supporting and raising and lowering said delivery conveyor, for the purpose described.

5. A motor operated material handling vehicle having a body to receive the materials for transportation, said body being large at its top and tapering to a narrow structure with a trough-like bottom, cover means for said trough-like bottom, a propeller in said trough-like bottom for moving material therealong to its discharge end, a delivery conveyor having one end pivotally supported under the discharge end of said trough-like member to receive material therefrom, a spherical member on said trough-like member, open at its top to receive material therefrom, and open in its bottom, a spherical member on said delivery conveyor in interfitting relationship with said first spherical member to turn therein about a horizontal axis and also to swing about a vertical axis, the overlapping sides of said spherical members confining the material therein, while permitting it to pass therethrough from one to the other and to said delivery conveyor, a propeller in said delivery conveyor for moving material therealong to the discharge end thereof, means for power operating said propellers in said conveyors, and means for supporting and raising and lowering said delivery conveyor.

CLARENCE J. POTTER.

REFERENCES CITED

The following references are of record in the file of this patent:

UNITED STATES PATENTS

| Number | Name | Date |
|---|---|---|
| 802,698 | Kern, Jr. | Oct. 24, 1905 |
| 2,093,300 | Adams et al. | Sept. 14, 1937 |
| 2,103,210 | Myers | Dec. 21, 1937 |
| 2,417,020 | Shugart | Mar. 4, 1947 |
| 2,438,301 | Schulte | Mar. 23, 1948 |
| 2,439,541 | Hall | Apr. 13, 1948 |
| 2,464,217 | Dillingham | Mar. 15, 1949 |
| 2,470,836 | Piper | May 24, 1949 |